United States Patent
Werner

(10) Patent No.: US 7,171,583 B2
(45) Date of Patent: Jan. 30, 2007

(54) FOR PPRC BACKUP SYSTEMS

(75) Inventor: Sam Clark Werner, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/731,920

(22) Filed: Dec. 10, 2003

(65) Prior Publication Data

US 2005/0144521 A1    Jun. 30, 2005

(51) Int. Cl.
*G06F 11/00* (2006.01)

(52) U.S. Cl. .............................. 714/6; 714/4

(58) Field of Classification Search .................. 714/4, 714/55, 56, 6
See application file for complete search history.

(56) References Cited

U.S. PATENT DOCUMENTS

| | | | |
|---|---|---|---|
| 5,894,583 A | 4/1999 | Johnson et al. | |
| 5,920,695 A | 7/1999 | Hathorn et al. | |
| 6,044,444 A | 3/2000 | Ofek | |
| 6,088,697 A | 7/2000 | Crockett et al. | |
| 6,105,078 A | 8/2000 | Crockett et al. | |
| 6,131,148 A | 10/2000 | West et al. | |
| 6,185,652 B1 | 2/2001 | Shek et al. | |
| 6,199,074 B1 | 3/2001 | Kern et al. | |
| 6,304,980 B1 | 10/2001 | Beardsley et al. | |
| 6,349,350 B1 | 2/2002 | Hathorn et al. | |
| 6,351,792 B1 | 2/2002 | Milillo | |
| 6,405,337 B1 * | 6/2002 | Grohn et al. ............... | 714/749 |
| 6,408,348 B1 | 6/2002 | Blount et al. | |

FOREIGN PATENT DOCUMENTS

| | | |
|---|---|---|
| WO | WO 01/67247 A1 | 9/2001 |
| WO | WO 01/73554 A2 | 10/2001 |

OTHER PUBLICATIONS

"IBM ESS (Shark) and SANsymphony TM Software—An IBM TotalStorage Proven TM Solution", DataCore Software Corporation, Jul. 2002, pp. 1-6.
"J. Consoli, Achieving Disaster Recovery Preparedness in PPRC Environments", INRANGE Technologies, pp. 1-31.

* cited by examiner

*Primary Examiner*—Robert Beausoliel
*Assistant Examiner*—Matt Urick
(74) *Attorney, Agent, or Firm*—Scully, Scott, Murphy & Presser, P.C.

(57) ABSTRACT

A system and method for extending peer-to-peer remote copy system operations that transfer data contents written to a first storage system from a host device to a remote second storage system over a communications link. The method includes setting a timer for a timeout period in which data contents written to the first storage system are to be transferred to the remote second storage system, determining if a successful transfer of the data contents has occurred within said timeout period; and, if no successful transfer has occurred within the timeout period, the step of initiating generation of a busy signal for receipt by the host device to prevent suspension of data content transfer operations for an additional timeout period. In this manner, the host device is available to write new data contents to the first storage system for subsequent transfer to the remote second storage system after the additional time out period.

15 Claims, 2 Drawing Sheets

FOR PPRC BACKUP SYSTEMS

BACKGROUND OF THE INVENTION

1. Field of the Invention

The present invention relates to data storage systems generally, and particularly, to improvements in a Peer-to-Peer Remote Copy system for data backup and data recovery.

2. Discussion of the Prior Art

Peer-to-Peer Remote Copy ("PPRC") is a hardware-based disaster recovery solution designed to maintain a mirror image of application data at a remote secondary location. Particularly, key to PPRC, is the migration of data sets from mass storage devices, such as hard disk drives or other data storage media, to another set with a minimum of disruption to the applications using the data. Particularly, Peer-to-Peer Remote Copy (PPRC) mechanisms automatically copy changes that are made to a source (primary) volume to a target (secondary) volume until the PPRC relationship is suspended or terminated.

FIG. 1 depicts, in general, a PPRC system 10 showing a primary Enterprise Storage System 15 including a primary production Enterprise Storage Server (ESS) 17 and a host server 20 running a host application that reads and writes data to the primary ESS 17. The primary ESS 17 is linked to a secondary ESS storage system 25 including a remotely located secondary backup 27 and corresponding remote back-up host server 30 via an Enterprise Systems Connection ("ESCON") connection 45. In current configurations, the enterprise connection 45 comprises a high-speed link, supporting, for example, 2-Gigabit-per-second (Gbps) Fibre/FICON data transfer rates, however, other ESS system configurations implementing other high-data rate connectivity are applicable. As known, peer-to-peer remote copy solutions comprises functionality for enabling direct and synchronous copying of data at the volume level from the primary ESS 17 to the secondary backup ESS 27. As known, the PPRC solution for direct copying of data is transparent to the operating system of the primary host server and any applications running on the primary host, however, there is a performance impact on application I/Os. Further, the default operation on certain ESS operating systems, e.g., the OS/390 and the z/OS operating systems, manufactured by International Business Machines, Armonk, N.Y., implements a 30-second missing-interrupt-handler (MIH) timeout for the ESS. Particularly, when a primary PPRC volume is having difficulty being communicated to the secondary remote PPRC volume, and a host is attempting to write to the primary volume, the ESS must suspend the PPRC relationship because the ESS cannot hold off the I/O for more than 30 seconds without causing an MIH (missing interrupt handler) error. That is, in a mirroring process executed by the PPRC in a synchronous data transfer mode, the PPRC primary host server 20 writes data to the ESS primary volume which data is then mirrored (transferred) to a corresponding secondary (remote ESS) volume. At the time of the write operation, the host server initiates the MIH timer for counting a timeout period e.g., 30 seconds, within which to expect a final status indicating the write operation to the remote volume has completed. However, within a pre-determined time period for performing the write operation as timed by an internal timer mechanism, the ESS primary data storage system that includes the primary volume must inform the host that a remote data transfer has successfully completed after the data storage system containing the secondary volume acknowledges that it has received and checked the mirrored data. If the primary ESS does not receive an ending status within that pre-determined time period, e.g., less than 30 seconds, then PPRC mirroring operations are suspended and an ending status is generated for the host in order to avoid the MIH timeout. The ESS will subsequently have to be re-synchronized and re-driven to effect the same remote PPRC data transfer data that had been previously suspended.

While commonly owned U.S. Pat. No. 5,894,583 describes a system for preventing erroneous indications which may be caused for an I/O request when it is unduly delayed by other contending operating system I/O requests, the system provides for variable MIH timeout periods for a delayed I/O request in predetermined extension increments. In U.S. Pat. No. 5,894,583, by issuing a long-busy interrupt signal, the operating system will cause the addition of an MIH timeout extension increment according to the nature of the reason for the time-out delay.

It would thus be highly desirable to provide a simple and easily implementable solution to avoid the suspension of write activity between the primary and secondary ESS pair in the first instance, and at least, provide a mechanism for enabling a host data volume transfer retry.

SUMMARY OF THE INVENTION

It is thus an object of the present invention to provide a system and method that avoids temporary suspensions of PPRC remote data volume transfers.

It is still another object of the present invention to provide a system and method that avoids temporary suspension of PPRC remote data volume transfers upon ESS system time outs, and enables a host redrive prior to suspending the primary and remote volume PPRC data transfer.

It is still a further object of the present invention to provide for peer-to-peer remote copy operations a system and method that re-initiates mirroring attempts by a host when a first attempt is unsuccessful due, for instance, to a communications problem between the primary and secondary volumes, thereby avoiding suspension of the mirroring and the occurrence of a "missing interrupt handler" suspension of copy operations.

According to the principles of the invention, there is provided a system and method for extending peer-to-peer remote copy system operations that transfer data contents written to a first storage system from a host device to a remote second storage system over a communications link. The method includes setting a timer for a timeout period in which data contents written to the first storage system are to be transferred to the remote second storage system; determining if a successful transfer of the data contents has occurred within the timeout period; and, if no successful transfer has occurred within the timeout period, the step of initiating generation of a busy signal for receipt by the host device to prevent suspension of data content transfer operations for an additional timeout period. In this manner, the host device is available to write new data contents to the first storage system for subsequent transfer to the remote second storage system after the additional time out period.

In a further embodiment, after determining if no successful transfer of data contents has taken place within the time out period, and prior to initiating generation of a busy signal for receipt by the host device there is included the further step of: determining if time remains within the timeout period, and if time remains, the system continues its attempts to transfer the data contents to the remote second storage system. However, if it determined that time does not remain within the timeout period, the system executes further steps of: incrementing a host retry counter for tracking a number of attempts to transfer data contents to the remote second storage system; and determining whether a number of host retries exceeds a max number of host retries. If the number of host retries does not exceed the maximum number of host retries, then the busy signal is generated.

Preferably, the host retry counter is incremented according to a weighting factor, the weighting factor determined according to an error type contributing to the unsuccessful transfer of data within the timeout period. Only if the number of host retries exceeds said max number of host retries, data content transfer operations between said first storage system and said remote second storage system is suspended.

Advantageously, the system and method that avoids temporary suspensions of PPRC remote data volume transfers according to the present invention is applicable for other types of ESS copy services including extended remote copy configurations.

BRIEF DESCRIPTION OF THE DRAWINGS

Further features, aspects and advantages of the apparatus and methods of the present invention will become better understood with regard to the following description, appended claims, and the accompanying drawing where:

DETAILED DESCRIPTION OF THE PREFERRED EMBODIMENTS

The present invention is directed to a system and method for initiating generation of a "busy" signal, e.g., a long busy, for receipt by the primary production host 20 (FIG. 1) so that when the primary host ESS redrives, the PPRC data volume transfer may continue between the primary and secondary ESS systems.

In a preferred embodiment, upon issuance of the "long busy" signal of a duration of 2 seconds, for example, a further amount of time, e.g., another 30 seconds, is available to the primary to try to send the data to the secondary. If the communication fails a predetermined number of times in a row based on a weighting factor, as will be described, only then will the pair be suspended.

Figure 1:
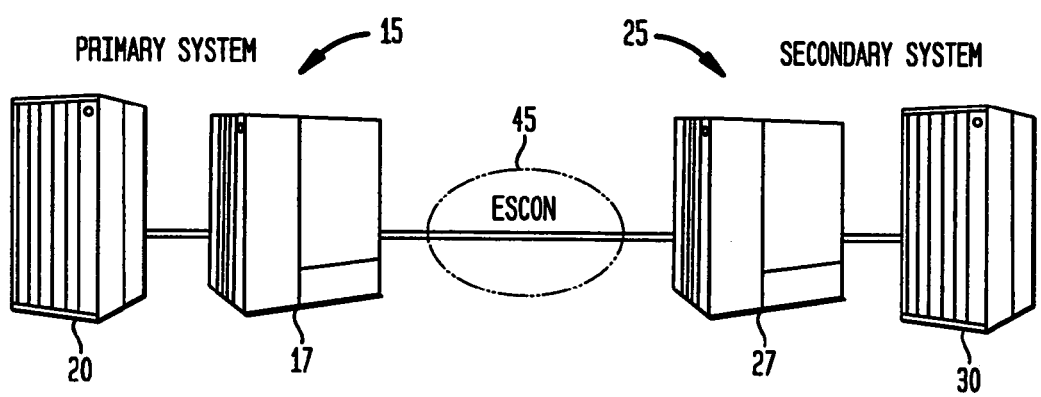
FIG. 1 depicts an exemplary PPRC system 10 showing a primary Enterprise Storage System 15 in communication with a secondary (remote) Enterprise Storage Systems 25.
Figure 2:
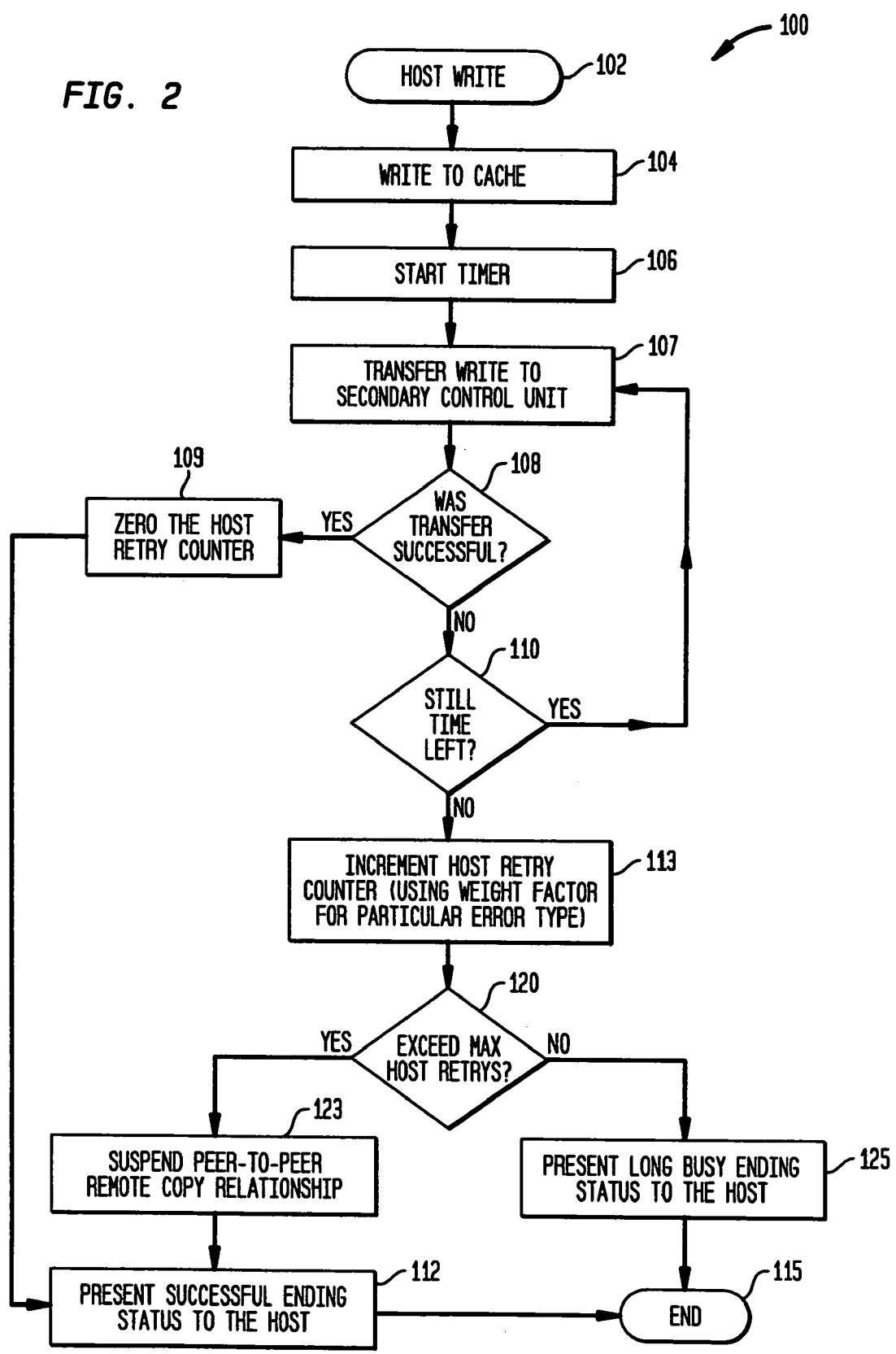
FIG. 2 is a flow chart depicting the methodology 100 for effecting the primary host re-drive according to the present invention.

As depicted in FIG. 2, there is illustrated the method for issuing a long busy signal to the host for the PPRC system solution according to the present invention. In the flow chart of FIG. 2, there is depicted a first step 102 indicating a write operation to a primary ESS 17 (FIG. 1). Subsequently, in accordance with synchronous PPRC communications, the I/O contents are written to a cache at step 104 and, at step 106, a timer count is initiated. In the allotted time, such as 30 seconds according to an embodiment of the PPRC system, a transfer write operation is to be performed, such as indicated at step 107, for communicating the written cached contents to be copied to a secondary control unit (remote copy to secondary backup ESS server 27). At step 108, a determination is made as to whether the transfer operation at step 106 was successful. If the transfer operation at step 106 was successful, i.e., was performed within the allotted time, then the process proceeds to step 109 to reset the host retry counter, e.g., by "zeroing" a retry counter that tracks the number of volume transfer attempts between the primary and secondary system for these cached contents. Upon successful remote volume copy (step 108) within the timer period, a successful indication of the remote copy is communicated to the host at step 112 and the process terminates at step 115.

Returning to step 108, if the remote copy transfer operation at step 106 was not successful, indicating a type of error that may or may not be recoverable, the system proceeds to step 110 to determine if there is still time left for performing the remote copy operation. If there is still time remaining within the allotted time, then the process returns back to step 107 to again perform the secondary volume transfer write operation for the cached contents to be copied. The steps of 107, 108 and 110 are performed until the cache contents are successfully written or until the timer period has run out. If the allotted period has timed out, as determined at step 110, then the process proceeds to step 113 to perform the step of incrementing the host retry counter. In the preferred embodiment, the host retry counter is incremented according to a weight factor that is predetermined according to a particular PPRC communications error type. For example, the weight factor may be based on the severity or likeliness of the error being recoverable. Continuing to step 120, a determination is then made as to whether the maximum number of host retries has been performed for the current transfer volume. If the maximum number of host retries has been performed, then the PPRC relationship is suspended at step 123, and an ending status is communicated back to the primary host 20 (FIG. 1) at step 112. If, at step 120, the maximum number of retires has not been exceeded, then the process proceeds to step 124 to initiate generation of a "long busy" ending status signal to the primary host 20 (FIG. 1) which causes the ESS primary to re-drive the I/O with a new MIH time-out period, e.g., for another 30 seconds, so that the primary may further attempt to send the data to the secondary remote ESS 27 (e.g., at step 107).

With respect to the application of a weight factor at step 113 (FIG. 2), a first example is now described. In the first example, it is assumed a port timeout error is encountered whereby a timeout occurs while a part of the ESS system is waiting for a port. It is understood that this may be the result of problems on an entirely different device that is sharing the same PPRC ports. Once that device suspends, it is assumed that the current PPRC system should be able to successfully use that port again. Accordingly, this error may receive and have associated therewith a relatively lower weight factor, which would enable more volume transfer attempts between the primary and secondary.

In the second example, it is assumed a timeout error occurs while transferring a long chain to the secondary. Such an example failure at the very end of the chain may be caused by link problems or, a temporary disruption at the secondary. This error will have associated therewith a relatively high weight factor. If this error occurs a few times in a row, then there would probably exist a problem that will require customer intervention to repair.

By using the weight factor in the manner described herein, it is ensured that the PPRC operation in the scenario described in example 1 is retried several times, while the PPRC operation in the scenario described in example 2 is retried only once. The invention may additionally account for combinations of the different problems. It is understood however, that the examples provided hereinabove do not include all scenarios and are only being used to illustrate how the weighting factor may be used.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described my invention, what I claim as new, and desire to secure by Letters Patent is:

1. A method for extending peer-to-peer remote copy system operations for transferring data contents written to a first storage system from a host device to a remote second storage system over a communications link, said method comprising:
   a) setting a timer for a timeout period in which data contents written to said first storage system are to be transferred to said remote second storage system;
   b) determining if a successful transfer of said data contents to said remote second storage system has occurred within said timeout period; and, if no successful transfer has occurred within said timeout period,
   c) initiating generation of a busy signal for receipt by said host device to prevent suspension of data content transfer operations between said first storage system and said remote second storage system for an additional timeout period, wherein said host device at said first storage system is available to write new data contents to said first storage system for subsequent transfer to said remote second storage system after said additional time out period.

2. The method for extending peer-to-peer remote copy system operations as claimed in claim 1, wherein prior to step c) and after said step b) the further step of: determining if time remains within said timeout period, and if time remains, continuing attempts to transfer said data contents to said remote second storage system.

3. The method for extending peer-to-peer remote copy system operations as claimed in claim 1, wherein prior to step c) and after said step b) the further step of: determining if time remains within said timeout period, and if time does not remain, the further steps of:
   incrementing a host retry counter for tracking a number of attempts to transfer data contents to said remote second storage system;
   determining whether a number of host retries exceeds a maximum number of host retries,
   wherein if the number of host retries does not exceed said maximum number of host retries, then initiating generation of a busy signal according to said step c).

4. The method for extending peer-to-peer remote copy system operations as claimed in claim 3, further comprising incrementing said host retry counter according to a weighting factor, said weighting factor determined according to an error type contributing to said unsuccessful transfer within said timeout period.

5. The method for extending peer-to-peer remote copy system operations as claimed in claim 3, wherein if the number of host retries exceeds said maximum number of host retries, said method further comprising the step of suspending said data content transfer operations between said first storage system and said remote second storage system.

6. A peer-to-peer remote copy system for transferring data contents written to a first storage system from a host device to a remote second storage system over a communications link, said system comprising:
   a timer device for a counting a timeout period in which data contents written to said first storage system are to be transferred to said remote second storage system over said link;
   means for determining if a successful transfer of said data contents to said remote second storage system has occurred within said timeout period; and,
   means for generating a busy signal for receipt by said host device to prevent suspension of data content transfer operations between said first storage system and said remote second storage system for an additional timeout period if no successful transfer has occurred within said timeout period, wherein said host device at said first storage system is available to write new data contents to said first storage system for subsequent transfer to said remote second storage system after said additional time out period.

7. The peer-to-peer remote copy system as claimed in claim 6, wherein if no successful transfer of said data occurs, said determining means further determining whether time remains within said timeout period, and if time remains, said system continuing attempts to transfer written data contents from a first storage system to said remote second storage system.

8. The peer-to-peer remote copy system as claimed in claim 7, further comprising:
   a host retry counter means for tracking a number of attempts to transfer data contents to said remote second storage system; and,
   means for determining whether a number of host retry attempts exceeds a maximum number of host retries, said busy signal being generated upon determination that the number of host retries does not exceed said maximum number of host retries.

9. The peer-to-peer remote copy system as claimed in claim 8, wherein said host retry counter means is incremented according to a weighting factor, said weighting factor determined according to an error type contributing to an unsuccessful transfer within said timeout period.

10. The peer-to-peer remote copy system as claimed in claim 8, further comprising means for suspending said data content transfer operations between said first storage system and said remote second storage system upon determination that a number of host retries exceeds said max number of host retries.

11. A program storage device readable by a machine, tangibly embodying a program of instructions executable by the machine to perform method steps for extending peer-to-peer remote copy system operations for transferring data contents written to a first storage system from a host device to a remote second storage system over a communications link, said method steps comprising:
   a) setting a timer for a timeout period in which data contents written to said first storage system are to be transferred to said remote second storage system;
   b) determining if a successful transfer of said data contents to said remote second storage system has occurred within said timeout period; and, if no successful transfer has occurred within said timeout period,
   c) initiating generation of a busy signal for receipt by said host device to prevent suspension of data content transfer operations between said first storage system and said remote second storage system for an additional timeout period, wherein said host device at said first storage system is available to write new data contents to said first storage system for subsequent transfer to said remote second storage system after said additional time out period.

12. The program storage device readable by a machine as claimed in claim 11, wherein prior to step c) and after said step b) the further step of: determining if time remains within said timeout period, and if time remains, continuing attempts to transfer said data contents to said remote second storage system.

13. The program storage device readable by a machine as claimed in claim 11, wherein prior to step c) and after said step b) the further step of: determining if time remains within said timeout period, and if time does not remain, the further steps of:

incrementing a host retry counter for tracking a number of attempts to transfer data contents to said remote second storage system;

determining whether a number of host retries exceeds a maximum number of host retries, wherein if the number of host retries does not exceed said maximum number of host retries, then initiating generation of a busy signal according to said step c).

14. The program storage device readable by a machine as claimed in claim 13, further comprising incrementing said host retry counter according to a weighting factor, said weighting factor determined according to an error type contributing to said unsuccessful transfer within said timeout period.

15. The program storage device readable by a machine as claimed in claim 13, wherein if the number of host retries exceeds said maximum number of host retries, the step of suspending said data content transfer operations between said first storage system and said remote second storage system.

* * * * *